UNITED STATES PATENT OFFICE.

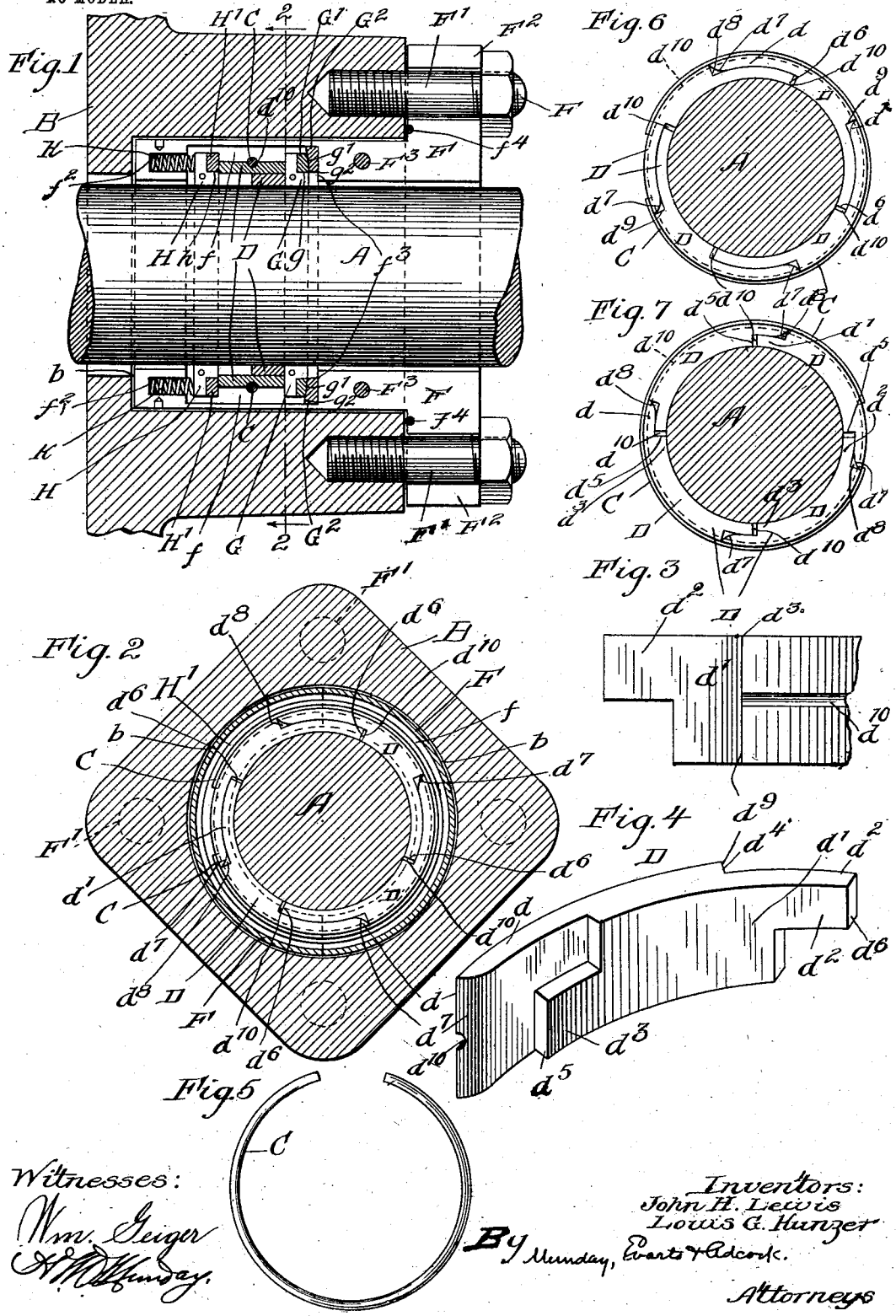

JOHN H. LEWIS AND LOUIS G. KUNZER, OF CHICAGO, ILLINOIS.

METALLIC PACKING FOR PISTON-RODS.

SPECIFICATION forming part of Letters Patent No. 721,709, dated March 3, 1903.

Application filed November 10, 1902. Serial No. 130,634. (No model.)

*To all whom it may concern:*

Be it known that we, JOHN H. LEWIS and LOUIS G. KUNZER, citizens of the United States, residing in Chicago, in the county of Cook and State of Illinois, have invented a new and useful Improvement in Metallic Packing for Piston-Rods, of which the following is a specification.

Our invention relates to improvements in metallic packing and glands for piston-rods, the same being specially adapted for use upon locomotives, though adapted for other uses.

The object of our invention is to provide a metallic packing and gland of simple, efficient, durable, and economical construction.

Our invention consists, in connection with the piston-rod and cylinder-head, of a divided or two-part gland secured to the cylinder-head and provided with an annular groove or chamber to receive the metallic packing, packing-case ring and follower, and a metallic packing comprising a plurality of segments the meeting ends of which are halved, offset, or notched in two planes transversely to each other, forming overlapping leaves, and three transverse joints at the meeting ends of the segments, each of which joints extends only part way through the packing and comes at a different point of the circumference from the others, so that the several joints break joints with each other. One joint extends through the outer half or portion of the packing-ring and the other two joints extend only part way through the inner half or portion of the packing-ring. The gland projects into the cylinder-head near to its inner end, and the annular groove or chamber formed therein to receive the packing is near the inner end of the gland, so that the packing is near the inner end or face of the cylinder-head, thus economizing the steam. The gland is provided with recesses, preferably four in number, to receive springs, said recesses opening into the annular groove or chamber which receives the packing, which springs bear against the follower to compress the packing laterally, so as to confine the steam in the packing recess or chamber of the gland, and thus cause it to exert the requisite pressure upon the outer periphery of the packing and properly compress the same.

Our invention also consists in the novel construction of parts and devices and in the novel combinations of parts and devices herein shown or described.

In the accompanying drawings, forming a part of this specification, Figure 1 is a longitudinal section of a piston-rod packing embodying our invention. Fig. 2 is a cross-section on the line 2 2 of Fig. 1. Fig. 3 is a detail elevation of the packing. Fig. 4 is a detail perspective view of one of the segments of the packing. Fig. 5 is a detail view of the clamp-ring, and Figs. 6 and 7 are opposite end views of the packing.

In said drawings, A represents a piston-rod, and B a portion of the cylinder-head through which the piston-rod reciprocates. The cylinder-head B is furnished with an opening or chamber $b$ to receive the packing-case and packing.

D is the metallic packing, the same comprising a plurality of segments, preferably four in number. Each of the segments D of the packing is halved, notched, or offset in two planes transversely to each other, the halving, notching, or offsetting in one plane or parallel to the circumference of the packing forming outer and inner overlapping leaves $d\,d'$. The inner leaf $d'$ is itself halved, notched, or offset transversely to the surface of the packing-ring, thus forming the interfitting tongues $d^2\,d^3$. This double-notching of the segments thus forms three joints $d^4$, $d^5$, and $d^6$, located at different points of the circumference or breaking joints with each other and each of which extends only part way through the packing-ring. The joint $d^4$ extends only through the outer half or portion of the packing-ring, and the joints $d^5\,d^6$ each extend only part way through the inner half or portion of the packing-ring. The outer leaf $d$ of each segment has a beveled, tapering, or curved face $d^7$ at its end, so that while leaving a space $d^8$ between itself and the shoulder $d^9$ to allow for contraction of the packing to compensate for wear it may still have close contact with said shoulder $d^9$. A corresponding space $d^{10}$ to allow for contraction of the packing is also provided at the inner joints $d^5\,d^6$.

C is the clamping ring or spring, which serves to hold the parts of the packing assembled or together.

F is the gland, which is secured to the cylinder-head B by bolts F', extending through its outer flange or shoulder F². The gland F is preferably divided or made in two parts secured together by bolts F³. The gland F projects into the chamber b of the cylinder-head to near the inner end or face of the cylinder-head, and it is provided near its inner end with an annular chamber or channel f to receive the packing D and the case, follower, and rings, which coöperate therewith. The gland F is also provided with recesses or holes f², preferably four in number, to receive the small coiled springs K, which press against the follower H. The follower H is preferably divided or made in two parts and has an annular shoulder h to receive its surrounding or clamping ring H'.

G is the case or ring which bears against the opposite end face of the packing D and is provided with an annular shoulder g to receive the clamping or encircling ring G'. This ring G' has a slightly beveled or curved face g', which bears against a corresponding beveled or curved face g² on the ring G², which is interposed between the ring G' and the shoulder or end face f³ of the recess f in the gland F. These slightly beveled or rounded faces thus interposed between the gland F and the case-ring of the packing permit of the necessary vibratory movement of the piston-rod in service.

A packing-ring f⁴, of wire or other material, is interposed between the gland F and cylinder-head B.

The pressure of the springs K against the follower serves to keep the packing D and rings G G' G² and shoulder f³ of the channel f closely abutted together, so as to confine the steam in the recess f, and thus cause the same to exert proper pressure upon the outer periphery of the packing D necessary to make the packing steam-tight, the springs K overcoming the tendency of the friction between the piston-rod and the packing D on the inward stroke of the piston-rod to slide the packing inward and open the joints between the packing and rings G G' G² and shoulder f⁴.

The clamping ring or spring C, which serves to hold the packing D together, is placed in a groove d¹⁰ in the packing D.

We claim—

1. The combination with a piston-rod and cylinder-head, of a divided or two-part gland secured to the cylinder-head and provided with an annular channel to receive a packing, of a metallic packing comprising a plurality of segments having each at their meeting ends double notches or offsets, forming overlapping leaves and three joints at different parts of the circumference, each of which extends only part way through the packing, a two-part or divided case-ring, a clamp-ring surrounding the same having a beveled or rounded face, a third ring interposed between said clamp-ring and the shoulder of said channel in the gland and having a beveled or rounded face to allow for the vibration of the piston-rod, a two-part or divided follower and a clamp-ring surrounding the same, and springs seated in holes or recesses of the gland and bearing against the follower, substantially as specified.

2. The combination with a piston-rod and cylinder-head, of a divided or two-part gland extending into the cylinder-head near its inner end or face, and provided with an annular channel near its inner end to receive a packing, and a metallic packing, case-ring and follower mounted in said channel of the gland, and springs bearing against the follower, substantially as specified.

3. The combination with a piston-rod and cylinder-head, of a divided or two-part gland extending into the cylinder-head near its inner end or face, and provided with an annular channel near its inner end to receive a packing, a metallic packing, case-ring and follower mounted in said channel of the gland, springs bearing against the follower, said gland having holes or recesses therein to receive the springs, substantially as specified.

4. The combination with a piston-rod and cylinder-head, of a gland projecting into the cylinder-head near the inner end thereof, and provided with a channel to receive the packing, of a metallic packing, a case, a clamp-ring encircling the case, having a slightly beveled or rounded outer face, and a ring interposed between said clamp-ring and the shoulder of said channel in the gland and provided with a beveled or rounded face engaging the face of the clamp-ring to enable the piston to have a slight vibratory movement without cramping or interfering with the packing, substantially as specified.

5. The combination with a piston-rod and cylinder-head, of a gland, a packing, a case-ring, and beveled or rounded bearing-faces interposed between the case-ring and the follower to enable the piston to have a slight vibratory movement without cramping or interfering with the packing, substantially as specified.

6. The combination with a piston-rod and cylinder-head, of a gland, a packing, a case-ring, and beveled or rounded bearing-faces interposed between the case-ring and the follower to enable the piston to have a slight vibratory movement without cramping or interfering with the packing, and a follower and springs bearing against the follower, substantially as specified.

7. The combination with a piston-rod and cylinder-head, of a gland, a segmental metallic packing, a case G, having shoulder g and ring G' inclosing the same, follower H, having shoulder h and ring H' embracing the same and springs K, substantially as specified.

8. The combination with a gland having an annular channel formed therein to receive a packing and follower and furnished with recesses for springs, of a metallic packing and a follower in said channel of the gland, and springs mounted in said recesses in the gland and bearing against the follower, substantially as specified.

9. The combination with a gland, of a case-ring, a metallic segmental packing, a follower, and a plurality of coiled springs bearing against the follower at different points of its circumference, said gland having an annular channel formed therein to receive said packing and follower, substantially as specified.

JOHN H. LEWIS.
LOUIS G. KUNZER.

Witnesses:
H. M. MUNDAY,
EDMUND ADCOCK.